W. D. KENDRICK.
WEATHER STRIP.
APPLICATION FILED APR. 16, 1917, RENEWED OCT. 24, 1918.
1,311,127. Patented July 22, 1919.
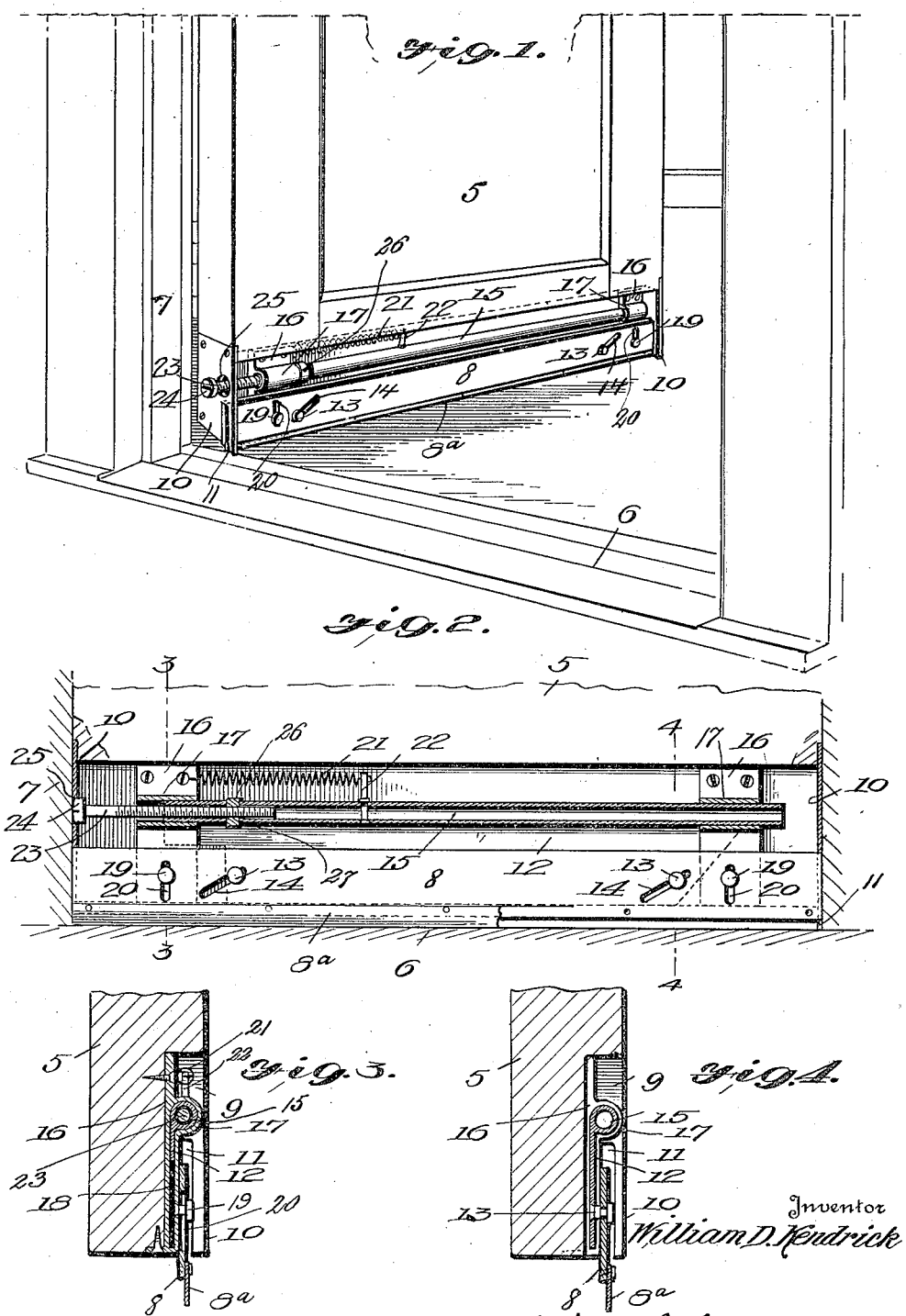

UNITED STATES PATENT OFFICE.

WILLIAM D. KENDRICK, OF MIAMI, ARIZONA, ASSIGNOR OF ONE-HALF TO ROBERT S. KNOWLES, OF GERONIMO, ARIZONA, AND ONE-EIGHTH TO JOHN S. VAN BUSKIRK, OF MIAMI, ARIZONA.

WEATHER-STRIP.

1,311,127.      Specification of Letters Patent.      Patented July 22, 1919.

Application filed April 16, 1917, Serial No. 162,448. Renewed October 24, 1918. Serial No. 259,594.

*To all whom it may concern:*

Be it known that I, WILLIAM D. KENDRICK, a citizen of the United States, residing at Miami, in the county of Gila and State of Arizona, have invented new and useful Improvements in Weather-Strips, of which the following is a specification.

This invention relates to devices designed for application to doors for the purpose of preventing the entrance of drafts, dust, etc., through the space between the bottom edge of the door and the threshold, when the door is closed.

It is the object of the invention to provide a novel and improved device of the kind stated which is automatically slid into operative position when the door is closed, and which slides to clear the threshold when the door is opened.

The object stated is attained by means of a combination and arrangement of parts to be hereinafter described and claimed, and in order that the same may be better understood, reference is had to the accompanying drawing forming a part of this specification.

In the drawing,

Figure 1 is a perspective view of the device as applied to the door;

Fig. 2 is a front elevation thereof, partly in section, and

Figs. 3 and 4 are vertical cross sections on the lines 3—3 and 4—4, respectively, of Fig. 2.

Referring specifically to the drawing, 5 denotes a fragment of an ordinary door seating, when closed, over a threshold 6. The jamb of the door frame to which the door is hinged is shown at 7, said jamb coöperating with certain parts of the invention to automatically actuate the same as will be presently described.

On the bottom of the door 5 is mounted a sheet metal or other strip 8 extending throughout the entire width of the door and vertically slidable so that it may engage the top of the threshold when the door is closed and thus prevent the passage of drafts, dust, etc., through the space between the threshold and the bottom edge of the door. The strip carries at its bottom edge a rubber or other flexible packing strip 8ª.

In the bottom portion of the door 5, on one side thereof, is made a recess 9 which houses the strip 8 and its actuating means, the ends of the recess being closed by plates 10 having vertical slots 11 in which the ends of the strip seat and are guided.

The actuating device of the strip 8 is a longitudinally slidable member 12 in the form of a flat sheet metal plate having on its outer face two projecting studs 13 which pass through slots 14 in the strip, said slots extending at an oblique angle with respect to the length of the strip, in view of which it will be evident that the strip is slid up or down when the member 12 is moved lengthwise.

The top edge of the member 12 is made tubular, as shown at 15, and said tubular portion seats in bearings fixed in the recess 9 in any suitable manner. Two of these bearings are provided, each of which comprises a base plate 16 having a cylindrical portion 17 through which the part 15 extends, and also provided with a vertical slot 18 in which the end of the member 12 slidably seats and is guided. The strip 8 seats on the face of the base plate 16 and from the latter extend studs 19 which pass through vertical guide slots 20 in the strip.

A coiled spring 21 is anchored at one end in the recess 9 and has its other end attached to a pin 22 fixed to the part 15, whereby the member 12 is given a normal tendency to slide in one direction, this being in the direction of the jamb 7.

That end of the part 15 which is opposite the jamb 7 carries a plunger 23 adapted to come in contact with said jamb when the door is closed thereagainst. The plunger is in the form of a screw stem having a head 24 at its outer end. The cover plate 10 at this end of the door has an aperture 25 through which the plunger head is free to pass. The plunger is adjustable in the direction of its length so that its head projects from the inner edge of the door a certain distance when the door is open, and thus comes against the jamb 7 when the door is closed. This adjustment is effected by turning the plunger in a nut 26 through which it is threaded, said nut being carried by the part 15, the same having a recess 27 in which the nut seats. This recess is adjacent to one end of the part 15 and the plunger extends into said part and through the nut, as shown in Fig. 2.

The spring 21 pulls the member 12 in a direction to elevate the strip 8 and to project the plunger head 24. Hence when the door is closed and the plunger head strikes the jambs 7, the member 12 is slid inward, whereupon the strip 8 is lowered to engage the threshold 6. When the door is opened, the spring 21 at once moves the member 12 outward to elevate the strip to clear the threshold. The device is therefore entirely automatic in operation, and requires no attention after it has been applied and adjusted to give the strip the required amount of vertical sliding movement. The nut 26 strikes the bearing 17 at the limit of the outward movement of the member 12 and these parts therefore serve as a stop for said member.

I claim:—

The combination with a swinging door and the jamb of the door frame against which the door closes, the door having a bottom recess on one side, and vertically slotted plates closing the ends of the recess; of a longitudinally slidable member in the door recess and having projecting studs, a vertically slidable weather-strip in the recess and seating at its ends in the slots of the end plates aforesaid, said weather-strip having oblique slots into which the aforesaid studs extend, a plunger carried by the longitudinally slidable member and projecting from one end thereof, said plunger having a threaded stem, and the longitudinally slidable member having a tubular portion into which the stem extends, said tubular portion having a recess, a nut seating in the recess, through which nut the stem is threaded, a spring connected to the longitudinally slidable member and moving the same in a direction to project the plunger from the door to engage the aforesaid jamb when the door is closed, and a bearing in the door recess in which the tubular portion of the longitudinally slidable member works, said bearing intercepting the aforesaid nut to limit the last-mentioned movement of said member.

In testimony whereof I affix my signature.

WILLIAM D. KENDRICK.

Copies of this patent may be obtained for five cents each, by addressing the "Commissioner of Patents, Washington, D. C."